United States Patent
Chin et al.

(10) Patent No.: US 9,804,302 B2
(45) Date of Patent: Oct. 31, 2017

(54) LIQUID CRYSTAL LENS STRUCTURE AND DRIVING METHOD THEREOF

(71) Applicant: SILICON TOUCH TECHNOLOGY INC., Hsinchu (TW)

(72) Inventors: Chi-Yuan Chin, Hsinchu (TW); Lin Ping Zhang, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 151 days.

(21) Appl. No.: 14/634,816

(22) Filed: Feb. 28, 2015

(65) Prior Publication Data

US 2016/0097948 A1 Apr. 7, 2016

(30) Foreign Application Priority Data

Oct. 1, 2014 (TW) .............................. 103134219 A

(51) Int. Cl.
- *G02F 1/1343* (2006.01)
- *G02F 1/133* (2006.01)
- *G02F 1/29* (2006.01)
- *G02B 3/14* (2006.01)

(52) U.S. Cl.
CPC ......... *G02B 3/14* (2013.01); *G02F 1/134309* (2013.01); *G02F 1/29* (2013.01); *G02F 2001/294* (2013.01)

(58) Field of Classification Search
None
See application file for complete search history.

(56) References Cited

U.S. PATENT DOCUMENTS

| | | | | |
|---|---|---|---|---|
| 2011/0069254 A1* | 3/2011 | Takama | ................... | G02B 3/14 349/62 |
| 2012/0075569 A1* | 3/2012 | Chang | ....................... | G02F 1/29 349/200 |
| 2012/0120333 A1* | 5/2012 | Chen | ....................... | G02B 3/14 349/33 |
| 2014/0049682 A1* | 2/2014 | Galstian | ................... | G02B 7/38 348/356 |

FOREIGN PATENT DOCUMENTS

| | | |
|---|---|---|
| CN | 103698957 A | 4/2014 |
| JP | 2007-041215 A | 2/2007 |
| JP | 2008529064 A | 7/2008 |
| JP | 2010-9584 | 1/2010 |
| TW | 200944837 | 11/2009 |
| TW | M478831 U | 5/2014 |
| WO | WO 2006/078806 A2 | 7/2006 |

\* cited by examiner

*Primary Examiner* — Ryan Crockett

(74) *Attorney, Agent, or Firm* — Li & Cai Intellectual Property (USA) Office

(57) ABSTRACT

A liquid crystal lens structure is disclosed, comprising a first substrate and a second substrate each having oppositely arranged sides, a first side and second side. A liquid crystal layer is disposed between the first substrate and the second substrate, in which first side of the first substrate and second side of the second substrate are proximate to the liquid crystal layer. A first transparent conductive layer is disposed between the first substrate and the liquid crystal layer. A second transparent conductive layer is disposed on the second side of the second substrate, in which the second transparent conductive layer comprises a circular opening and a circular electrode in the circular opening. Thus, the invention can provide better response time and improve efficiency of the liquid crystal lens structure.

4 Claims, 11 Drawing Sheets

US 9,804,302 B2

LIQUID CRYSTAL LENS STRUCTURE AND DRIVING METHOD THEREOF

BACKGROUND OF THE INVENTION

1. Field of the Invention

The instant disclosure relates to an optical structure; in particular, to a liquid crystal lens structure and a driving method thereof.

2. Description of Related Art

The liquid crystal lens structure is a lens capable of varying focal length. When the liquid crystal lens structure is in use, an external circuit applies a voltage signal to electrode layers to generate an electrical field between the electrode layers that are arranged on two sides of a crystal liquid layer. The deflection angle of the liquid crystal molecules in the liquid crystal layer is controlled by the electrical field in an orderly fashion in order to provide optical effects similar to an optical lens. When light rays pass through the liquid crystal lens structure, paths of the light rays are affected by the orientation of the liquid crystal molecules to provide optical effects of focusing and defocusing.

Typically, the arrangement of liquid crystal molecules in the liquid crystal lens structure provides optical lens effects by modifying the structural design of the electrodes. Please refer to FIGS. 1A to 1C. As shown in FIG. 1A, a conventional liquid crystal lens structure includes a liquid crystal layer 110, a first substrate 102, a second substrate 104, a first transparent conductive layer 106 located between the liquid crystal layer 110 and the first substrate 102, and a second transparent conductive layer 108 located between the liquid crystal layer 110 and the second substrate 104. The first substrate 102 and second substrate 104 are arranged on opposite sides of the liquid crystal layer 110, or the liquid crystal layer 110 is interposed between the two substrates. FIG. 1B shows a top view of the first transparent conductive layer while FIG. 1C shows a top view of the second transparent conductive layer of the conventional liquid crystal lens structure. The first transparent conductive layer 106 is a structural layer without any openings, whereas the second transparent conductive layer 108 has a circular opening 112.

The second transparent conductive layer 108 includes a circular opening 112 in order to generate a progressive electrical field that applies on the liquid crystal layer 110, so that the angle and refractive index distribution of the liquid crystal molecules resemble that of a quadratic curve distribution, which provides the characteristics of optical focusing. However, since each liquid crystal molecule in the circular opening 112 does not receive the same amount of voltage, the timing for each liquid crystal molecule from the beginning of the rotation to the targeted deflection angle varies, which can affect the overall response time. Notably, the liquid crystal molecules located at the center of the circular opening 112 rotate at a relatively slower rate. The inventor identified that the transparent conductive layers 106 and 108 that are located on two sides of the liquid crystal layer 110 for electrodes and the electrode design of the second transparent conductive layer 108 that has a circular opening 112 cannot possibly provide short enough response time. In order to reduce the response time with limited voltage, redesign and new arrangement of the electrode structure in a liquid crystal lens structure is necessary to enhance performance.

To address the above issues, the inventor strives via associated experience and research to present the instant disclosure, which can effectively improve the limitation described above.

SUMMARY OF THE INVENTION

The objective of the instant disclosure is to provide a liquid crystal lens structure that has electrode structural arrangement and design distinct from the conventional arts and, via experimental confirmation, can enhance the effectiveness of the liquid crystal lens as well as provide the most preferred response time.

In order to achieve the aforementioned objectives, according to an embodiment of the instant disclosure, a liquid crystal lens structure is provided. The liquid crystal lens structure includes a first substrate having two oppositely arranged sides, a first side and second side; a second substrate having two oppositely arranged sides, a first side and second side; a liquid crystal layer interposed between the first substrate and the second substrate, in which the first side of the first substrate and the first side of the second substrate are arranged proximate to the liquid crystal layer; a first transparent conductive layer interposed between the first substrate and the liquid crystal layer; and a second transparent conductive layer arranged on the second side of the second substrate, in which the second transparent conductive layer has a circular opening and a circular electrode, and the circular electrode is arranged in the circular opening.

Another embodiment provides a liquid crystal lens structure that includes: a first substrate having two oppositely arranged sides, a first side and second side; a second substrate having two oppositely arranged sides, a first side and second side; a liquid crystal layer interposed between the first substrate and the second substrate, in which the first side of the first substrate and the first side of the second substrate are arranged proximate to the liquid crystal layer; a first transparent conductive layer interposed between the first substrate and the liquid crystal layer; and a second transparent conductive layer arranged on the second side of the second substrate, in which the second transparent conductive layer has a circular opening, a circular electrode, and at least one annular electrode, the circular electrode is arranged in the circular opening, and the annular electrode circumscribes the circular electrode. The first transparent conductive layer is defined as a first electrode, portions of the second transparent conductive layer circumscribing the circular opening are defined as a second electrode, the circular electrode applies a first voltage, the at least one annular electrode applies a second voltage, the second electrode applies a third voltage, and the first electrode applies a fourth voltage. The second, third, and fourth voltage are applied in a specific order for maintaining response time of the liquid crystal lens structure within a target response time.

Another embodiment provides a liquid crystal lens driving method which includes: providing a liquid crystal lens structure, comprising: a first substrate; a second substrate; a liquid crystal layer interposed between the first substrate and the second substrate; a first transparent conductive layer interposed between the first substrate and the liquid crystal layer; a second transparent conductive layer arranged on a side of the second substrate, in which the second transparent conductive layer has a circular opening, a circular electrode, and at least one annular electrode, the circular electrode is arranged in the circular opening, and the at least one annular electrode circumscribes the circular electrode. The first transparent conductive layer is defined as a first electrode, and portions of the second transparent conductive layer circumscribing the circular opening are defined as a second electrode. An overdrive voltage is applied to the circular electrode, the at least one annular electrode, and the second electrode, and the magnitude of the overdrive voltages that are respectively applied to the circular electrode, the at least one annular electrode, and the second electrode, in that order, are in a straightly descending or ascending order. A steady-state voltage is applied to the circular electrode, the at least one annular electrode, and the second electrode, and the magnitude of the steady-state voltages that are respectively applied to the circular electrode, the at least one annular electrode to the second electrode, in that order, are in a straightly descending or ascending order.

In summary, the instant disclosure provides beneficial effects by disposing the first transparent conductive layer on a side of the first substrate proximate to the liquid crystal layer, and disposing the second transparent conductive layer on a side of the second substrate distal from the liquid crystal layer, arranging a circular electrode and one or more annular electrodes in the circular opening of the transparent conductive layer that is disposed on the side of the second substrate distal from the liquid crystal layer, and each circular electrode and annular electrode can independently apply different voltage in sequence, such that the liquid crystal molecules in the circular opening can receive the precise applied voltage, reach the desired deflection angle within the shortest amount of time, and in turn the liquid crystal lens structure can obtain the preferable or even the most preferred response time.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplary for the purpose of further explaining the scope of the instant disclosure. Other objectives and advantages related to the instant disclosure will be illustrated in the subsequent descriptions and appended drawings.

First Embodiment

Figure 1A:
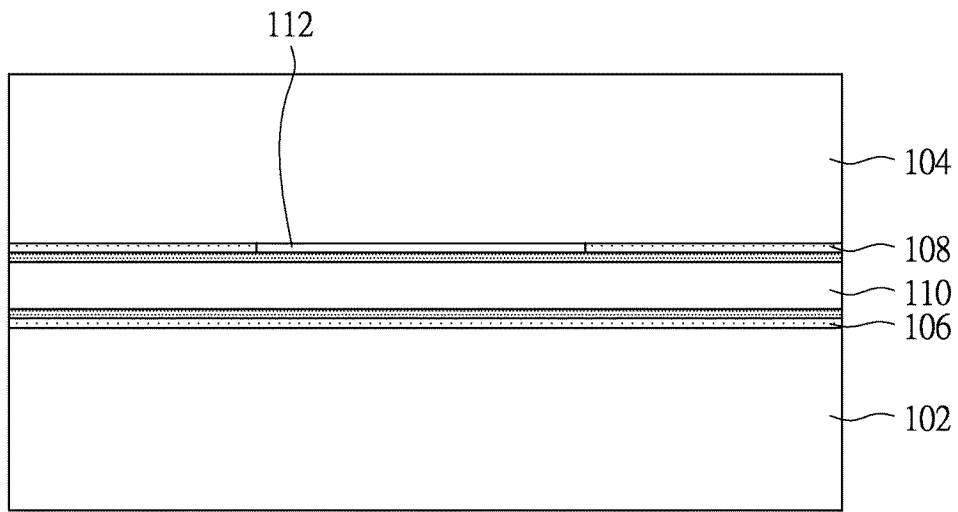
FIG. 1A is a cross-sectional view of a conventional liquid crystal lens structure.
Figure 1B:
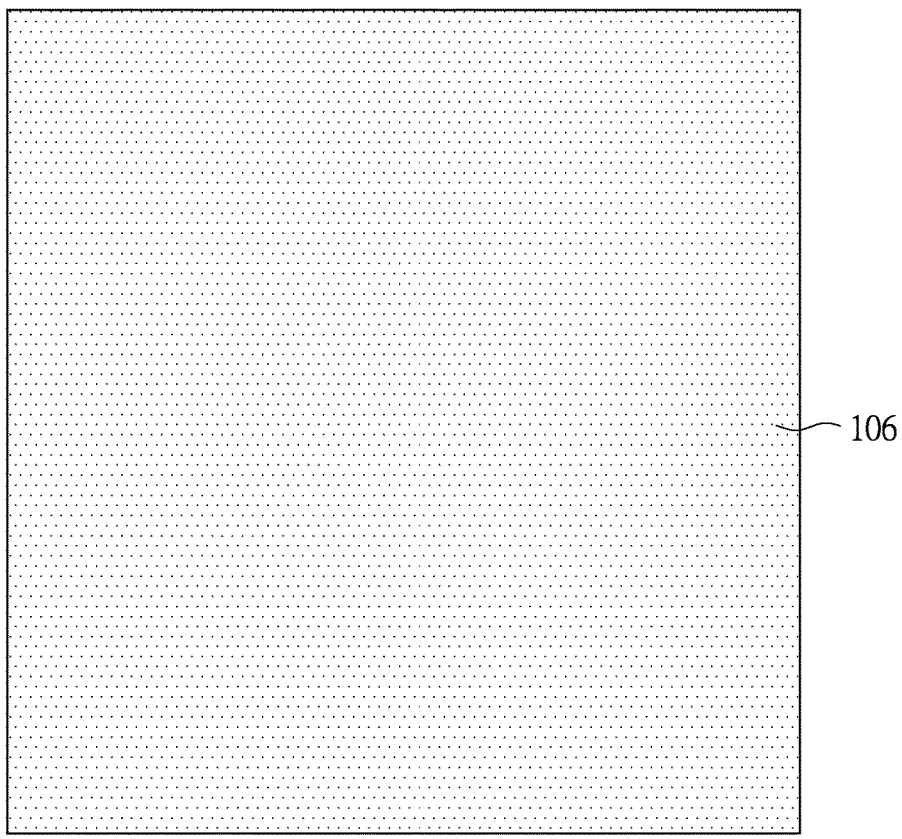
FIG. 1B is a planar view of a first transparent conductive layer as shown in FIG. 1A in accordance with the instant disclosure.
Figure 1C:
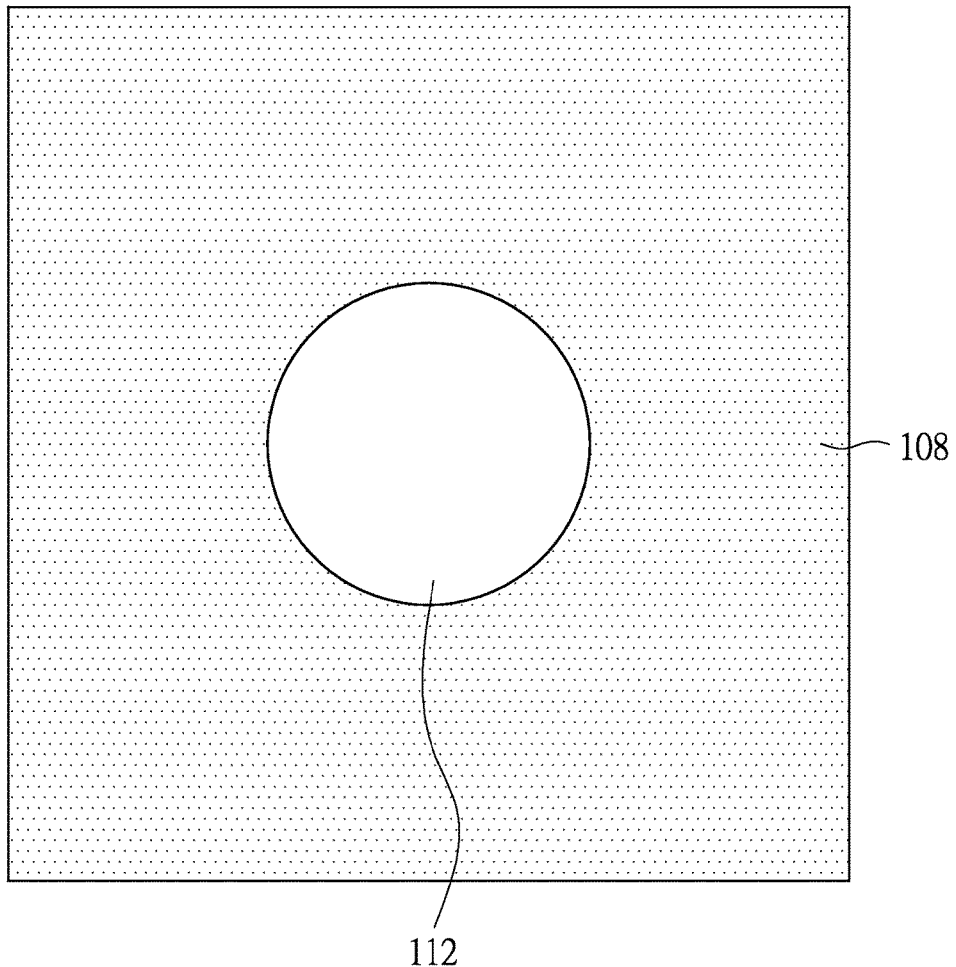
FIG. 1C is a planar view of a second transparent conductive layer as shown in FIG. 1A in accordance with the instant disclosure.
Figure 2A:
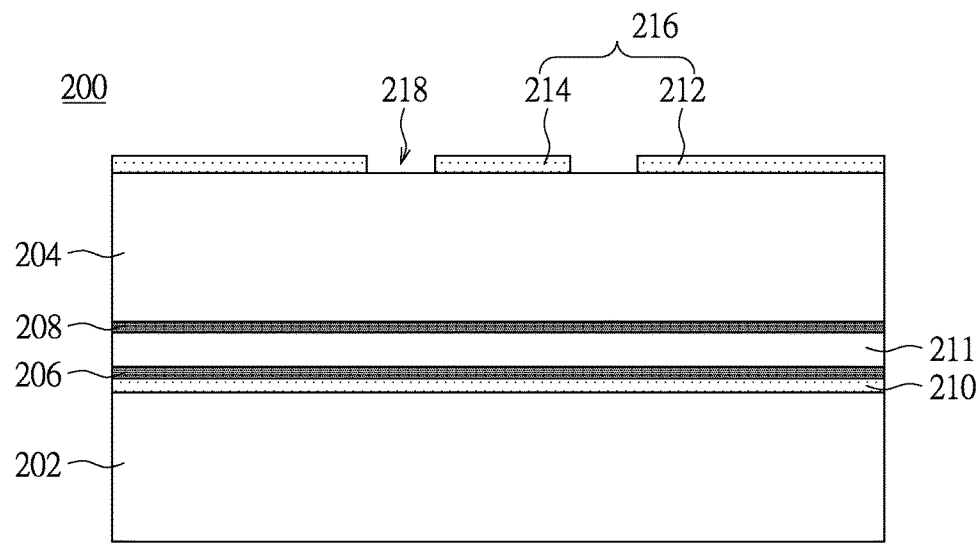
FIG. 2A is a cross-sectional view of a liquid crystal lens structure in accordance with a first embodiment of the instant disclosure.
Figure 2B:
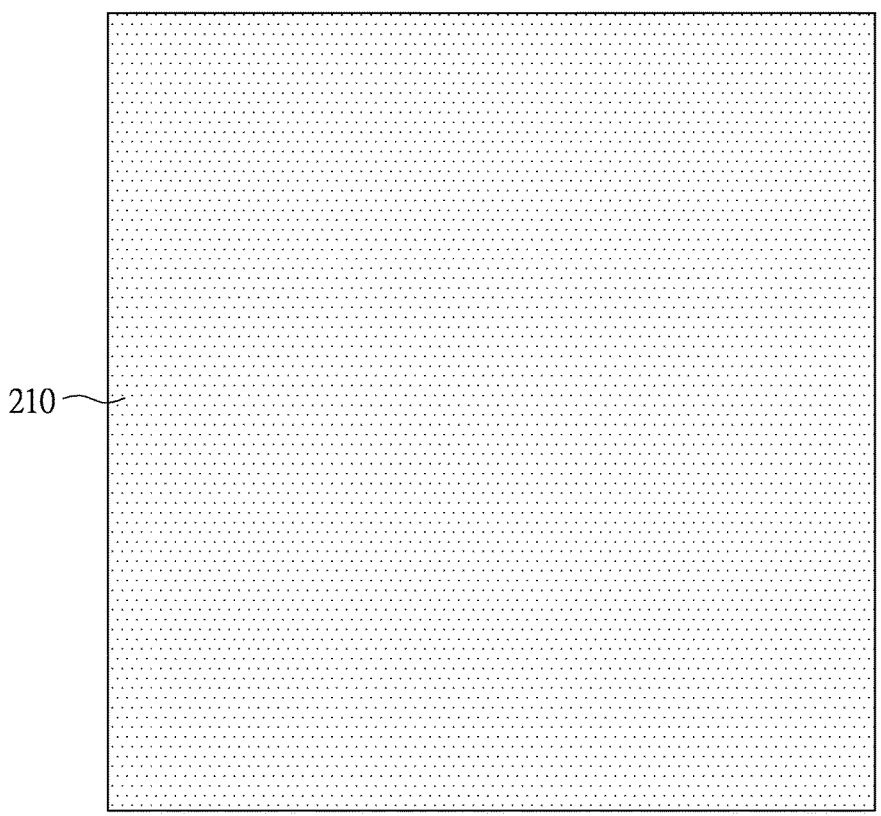
FIG. 2B is a planar view of a first transparent conductive layer as shown in FIG. 2A in accordance with the instant disclosure.
Figure 2C:
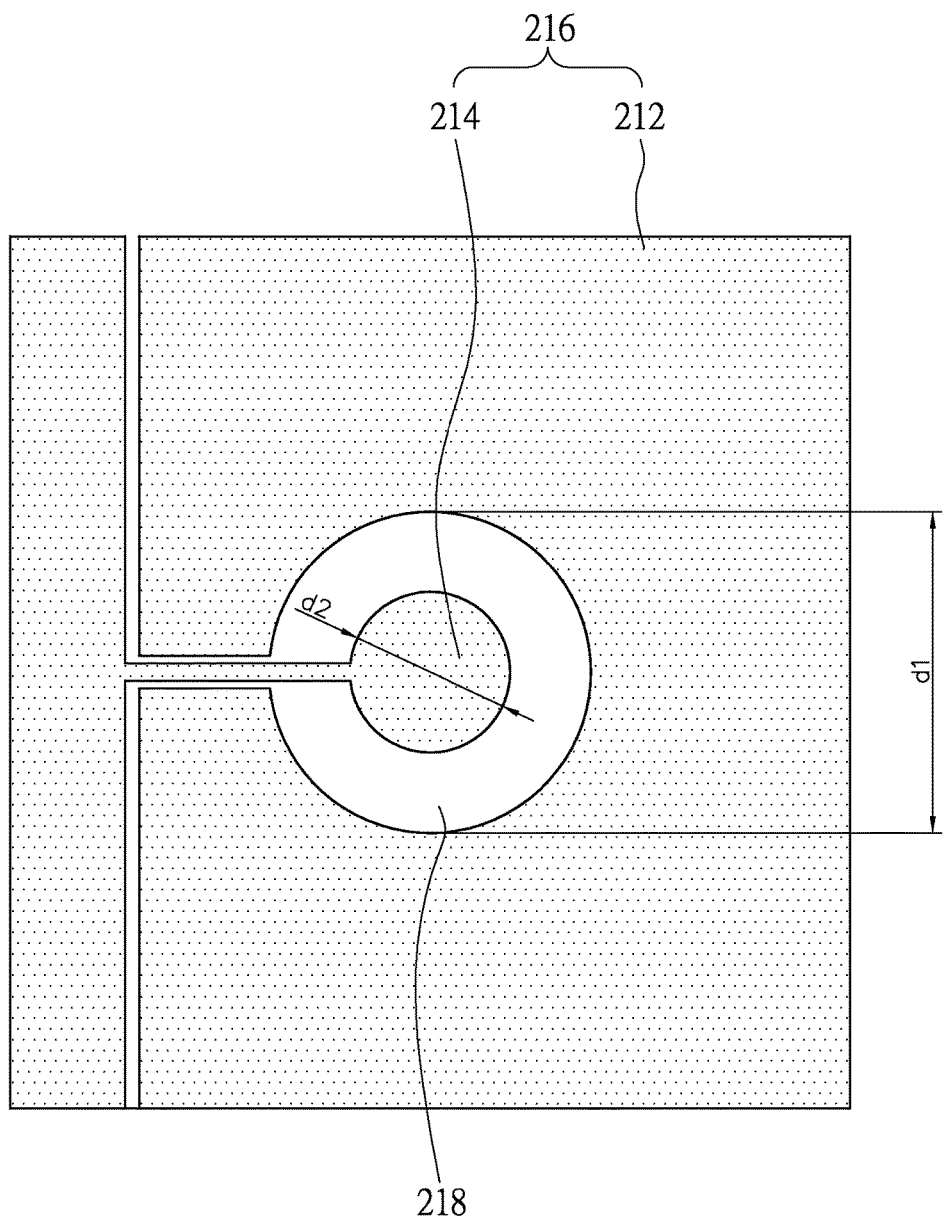
FIG. 2C is a planar view of a second transparent conductive layer as shown in FIG. 3A in accordance with the instant disclosure.

Please refer to FIGS. 2A to 2C. FIG. 2A is a cross-sectional view, FIG. 2B is a planar view of a first transparent conductive layer, and FIG. 2C is a planar view of a second transparent conductive layer. The first embodiment of the instant disclosure provides a liquid crystal lens 200, which includes the oppositely arranged first substrate 202 and second substrate 204. The first substrate 202 and the second substrate 204 each have two oppositely arranged sides, a first side and a second side. A liquid crystal layer 211 is interposed, or clamped, between the first and second substrates 202, 204. The first side of the first substrate 202 and the first side of the second substrate 204 are arranged near the liquid crystal layer 211.

A first transparent conductive layer 210 is interposed between the first substrate 202 and the liquid crystal layer 211, and a second transparent conductive layer 216 is located on the second side of the second substrate 204. The second transparent conductive layer 216 has a circular opening 218. The circular opening 218 has a diameter $d_1$, and the second transparent conductive layer 216 further includes a circular electrode 214, having a diameter $d_2$, that is located in the circular opening 218. The diameter $d_2$ of the circular electrode 214 is smaller than the diameter $d_1$ of the circular opening 218.

In an embodiment, the diameter $d_2$ of the circular electrode 214 can range from 0.5 to 1.5 mm, and the diameter $d_1$ of the circular opening 218 can range from 1.5 to 3.5 mm. However, the diameters of the circular electrode 214 and the circular opening 218 can be modified according to the specification of the products and are not limited to the examples provided herein. In another embodiment, the circular electrode 214 and the circular opening 218 are spaced apart by a gap that ranges from 0.1 mm to 0.5 mm.

The first transparent conductive layer 210 is also defined as a first electrode, portions of the second transparent conductive layer 216 circumscribing the circular opening 218 are defined as a second electrode 212. The first electrode 210, the second electrode 212, and the circular electrode 214 are mutually spaced apart from one another.

In an embodiment, the first electrode applies a first voltage, the second electrode applies a second voltage, and the circular electrode applies a third voltage, in which the second and the third voltages are different. The embodiment can specifically choose the proper first, second, and third voltage to apply to the liquid crystal lens structure 200 in order to provide a response time within a target value. For example, the circular electrode 214 applies a high voltage for a certain amount of time at the beginning, where the choice of voltage in that certain amount of time can set the liquid crystal molecules to a preset deflection angle such that the response time of the liquid crystal lens structure is within a target value. The high voltage, for example, can range from 40 to 50 V, however, the value of high voltage can be modified according to the specification of the product, and is not limited to the examples provided herein.

The liquid crystal lens structure in the instant embodiment further includes a first alignment layer 206 located between the first transparent conductive layer 210 and the liquid crystal layer 211, and a second alignment layer 208 located between the substrate 204 and the liquid crystal layer 211.

Notably, the liquid crystal lens can generate effects similar to that of an optical lens via modifications of the deflection angle on liquid crystals with respect to light passing through the crystals. Transparent materials are used for various layers of the liquid crystal lens structure of the instant embodiment, so that light can pass through the liquid crystal lens structure. For example, the first substrate 202 and the second substrate 204 can be made of silicon nitride compounds ($SiN_x$), silicon oxide compounds ($SiO_x$), resins, polyimides, or other organic as well as inorganic insulating materials.

Moreover, the first transparent conductive layer 210 and the second transparent conductive layer 216 can be made of translucent or transparent conductive materials such as Indium tin oxide (ITO), Indium zinc oxide (IZO), or Indium gallium zinc oxide (IGZO), but are not limited to the examples provided herein.

Furthermore, the thickness of various layers of the liquid crystal lens can affect the way light passes through the liquid crystal lens structure, the drive into the liquid crystal layer, and the deflection magnitude of the electric field by the liquid crystal molecules. Please refer to FIG. 2A once again. In the instant embodiment, the liquid crystal layer has a thickness ranges from 20 to 50 μm, while the first substrate 202 and the second substrate 204 each have a thickness that ranges from 0.1 to 0.4 mm. In addition, the first transparent conductive layer 210 and the second transparent conductive layer 216 each have a thickness that ranges from 10 to 300 nm, but are not limited to the examples provided herein.

Through applicant's research, the second transparent conductive layer 216 is disposed on the second substrate 204 while the first transparent conductive layer 210 is interposed between the first substrate 202 and the liquid crystal layer 211 in order to get the most preferred image and video quality. The preferred quality is due to the circular electrode 214, the circular opening 218, and the second transparent conductive layer 216 being disposed on the surface of the second substrate 204 distal from the liquid crystal layer 211, at this point, the liquid crystal responds with changes along a gradient index that is relatively close to a quadratic curve. When the circular electrode 214, the circular opening 218, and the second transparent conductive layer 216 are disposed on the surface of the second substrate 204 proximate to the liquid crystal layer 211, although the liquid crystal lens is still in operation, the optical effects are relatively worse compared to the prior conditions. The second transparent conductive layer 216, including the circular opening 218 and the circular electrode 214 that is located in the circular opening 218, provides a special arrangement between the electrodes. Accordingly, the aforementioned structural conditions effectively reduce response time and improve upon the effects of the liquid crystal lens structure and the products having such structure.

Second Embodiment

Figure 3A:
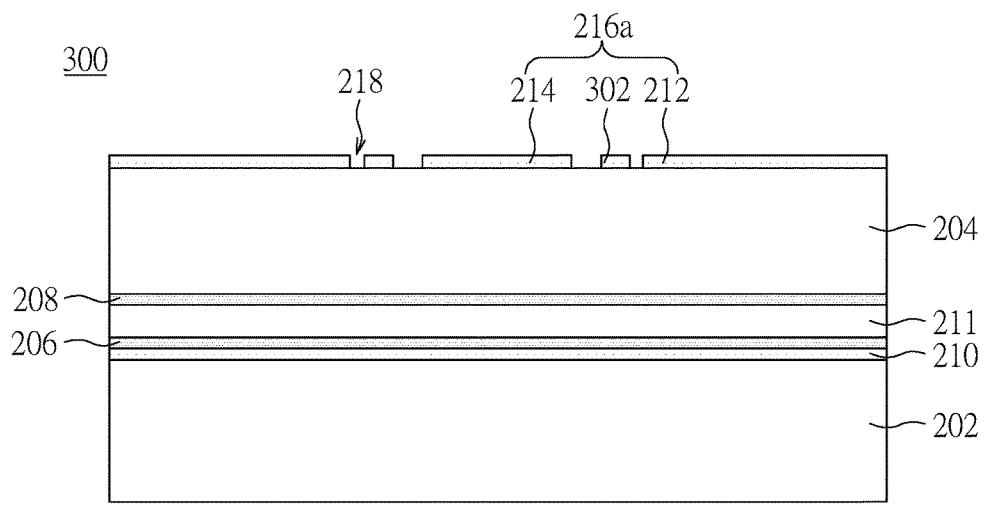
FIG. 3A is a cross-sectional view of a liquid crystal lens structure in accordance with a second embodiment of the instant disclosure.
Figure 3B:
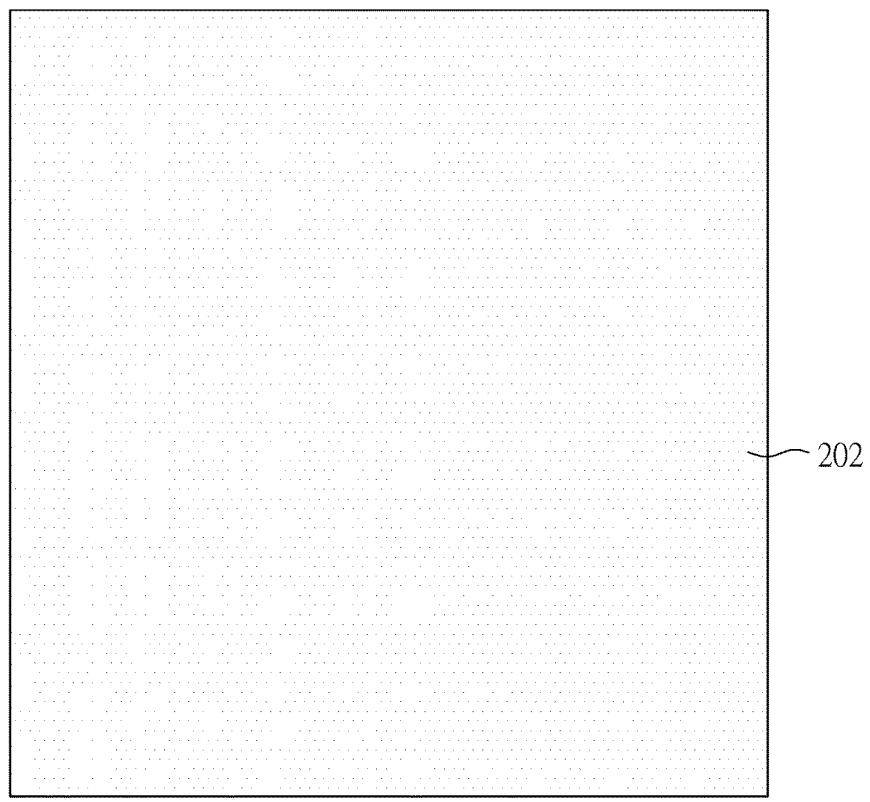
FIG. 3B is a planar view of a first transparent conductive layer as shown in FIG. 3A in accordance with the instant disclosure.
Figure 3C:
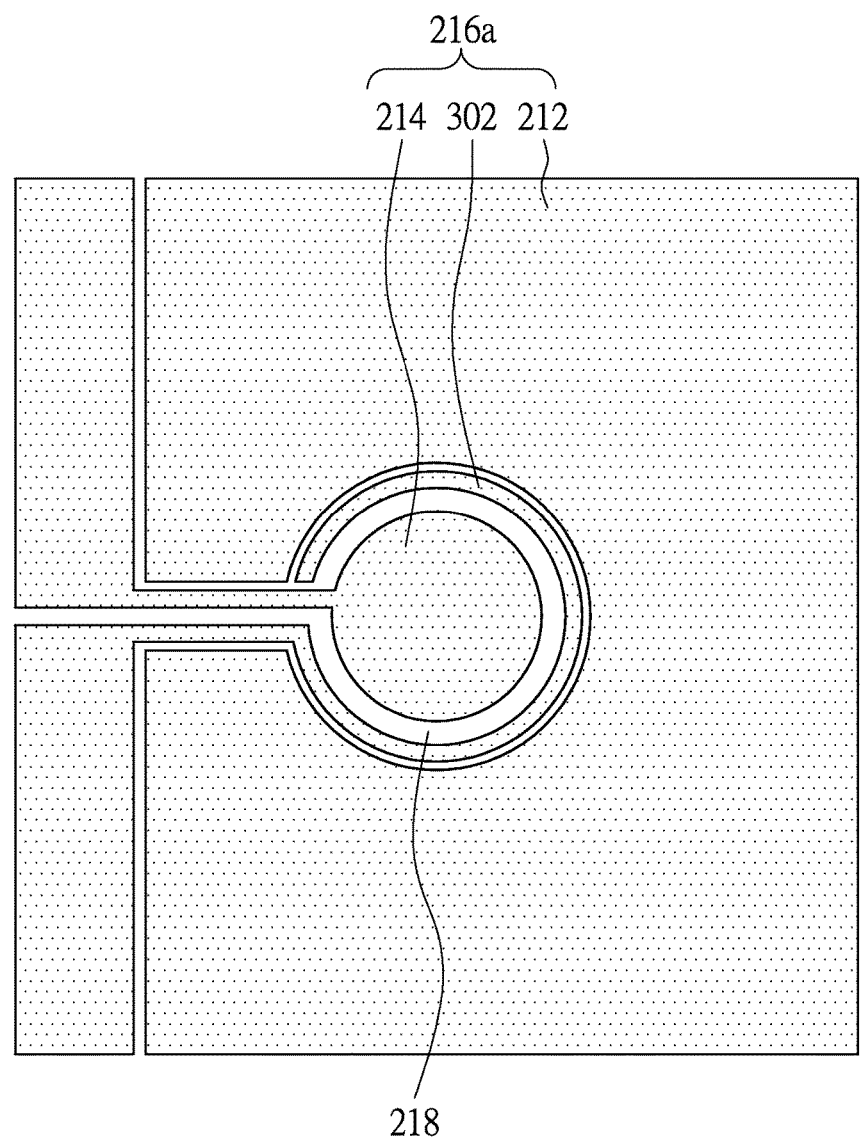
FIG. 3C is a planar view of a second transparent conductive layer as shown in FIG. 3A in accordance with the instant disclosure.

FIG. 3A shows a cross-sectional view of the liquid crystal lens structure, FIG. 3B shows a planar view of a first transparent conductive layer, and FIG. 3C shows a planar view of a second transparent conductive layer in accordance with a second embodiment of the instant disclosure. The liquid crystal lens structure of the instant disclosure includes a first substrate 202, a second substrate 204, a liquid crystal layer 211, a first transparent conductive layer 210, a second transparent conductive layer 216a, a first alignment layer 202, and a second alignment layer 208. Details regarding the order of the layers are relatively the same as the first embodiment, thus are not further disclosed herein.

The instant embodiment differs from the previous embodiment in that, the second transparent conductive layer 216a further includes an annular electrode 302 that is located in the circular opening 218 and circumscribes the circular electrode 214. Accordingly, the first transparent conductive layer is defined as the first electrode, portions of the second transparent conductive layer 216a circumscribing the circular opening 218 are defined as the second electrode. The first electrode, the second electrode, the circular electrode 214, and the annular electrode 302 are mutually spaced apart from one another. In the instant embodiment, the circular electrode 214 in the second transparent conductive layer 216a and the first annular electrode 302 are mutually spaced apart by a gap that ranges from 0.1 to 0.5 mm.

Accordingly, the first electrode, the second electrode, the circular electrode 214, and the first annular electrode 302 can apply independent voltage. The annular electrode 302 can apply independent voltage to provide more accurate control of electric field on the liquid crystal molecules, and since the second transparent conductive layer 216a is disposed on the second side of the second substrate 204 opposite the liquid crystal layer, a more preferred image and video quality is achieved (the reason being that when the circular electrode 214, the circular opening 218, and the second transparent conductive layer 216a are disposed on the surface of the second substrate 204 distal from the liquid crystal layer 211, the liquid crystal responds with changes along a gradient index that is relatively close to a quadratic curve). When the circular electrode 214, the circular opening 218, and the second transparent conductive layer 216a are disposed on the surface of the second substrate 204 proximate to the liquid crystal layer 211, although the liquid crystal lens is still in operation, the optical effects are relatively worse compared to the prior conditions, thus, the liquid crystal lens structure of the instant embodiment has shorter response time. Namely, the first electrode applies a first voltage, the second electrode applies a second voltage, the circular electrode 214 applies a third voltage, and annular electrode 302 applies a fourth voltage. The order, in which the second, third, and fourth voltage are applied, is specifically designed such that the liquid crystal lens structure 300 has a response time within a target value.

Third Embodiment

Figure 4A:
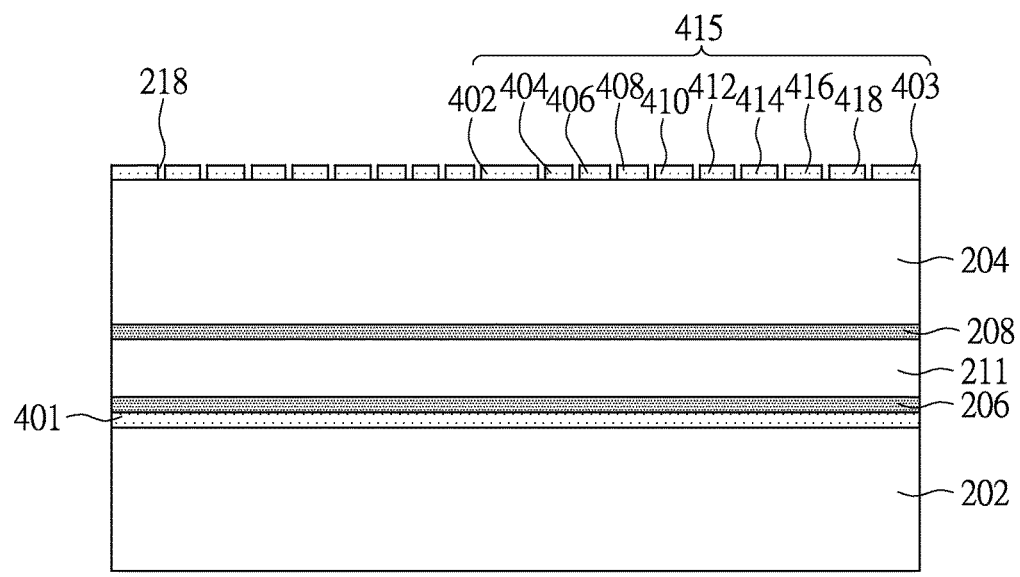
FIG. 4A is a cross-sectional view of a liquid crystal lens structure in accordance with a third embodiment of the instant disclosure.
Figure 4B:
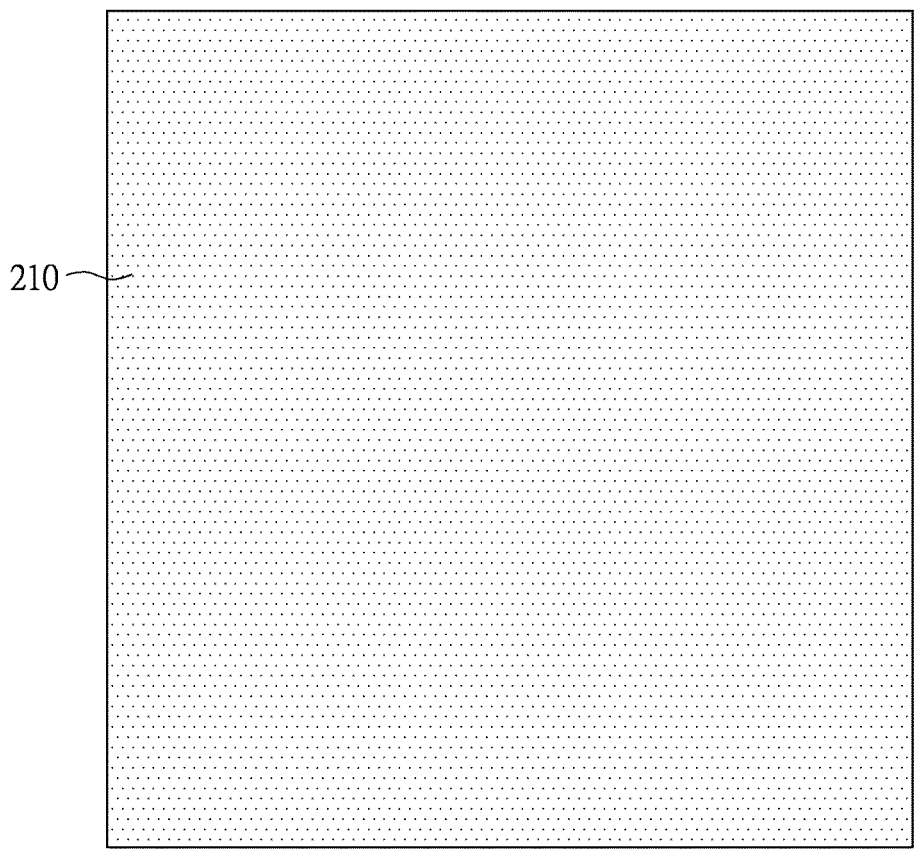
FIG. 4B is a planar view of a first transparent conductive layer as shown in FIG. 4A in accordance with the instant disclosure.
Figure 4C:
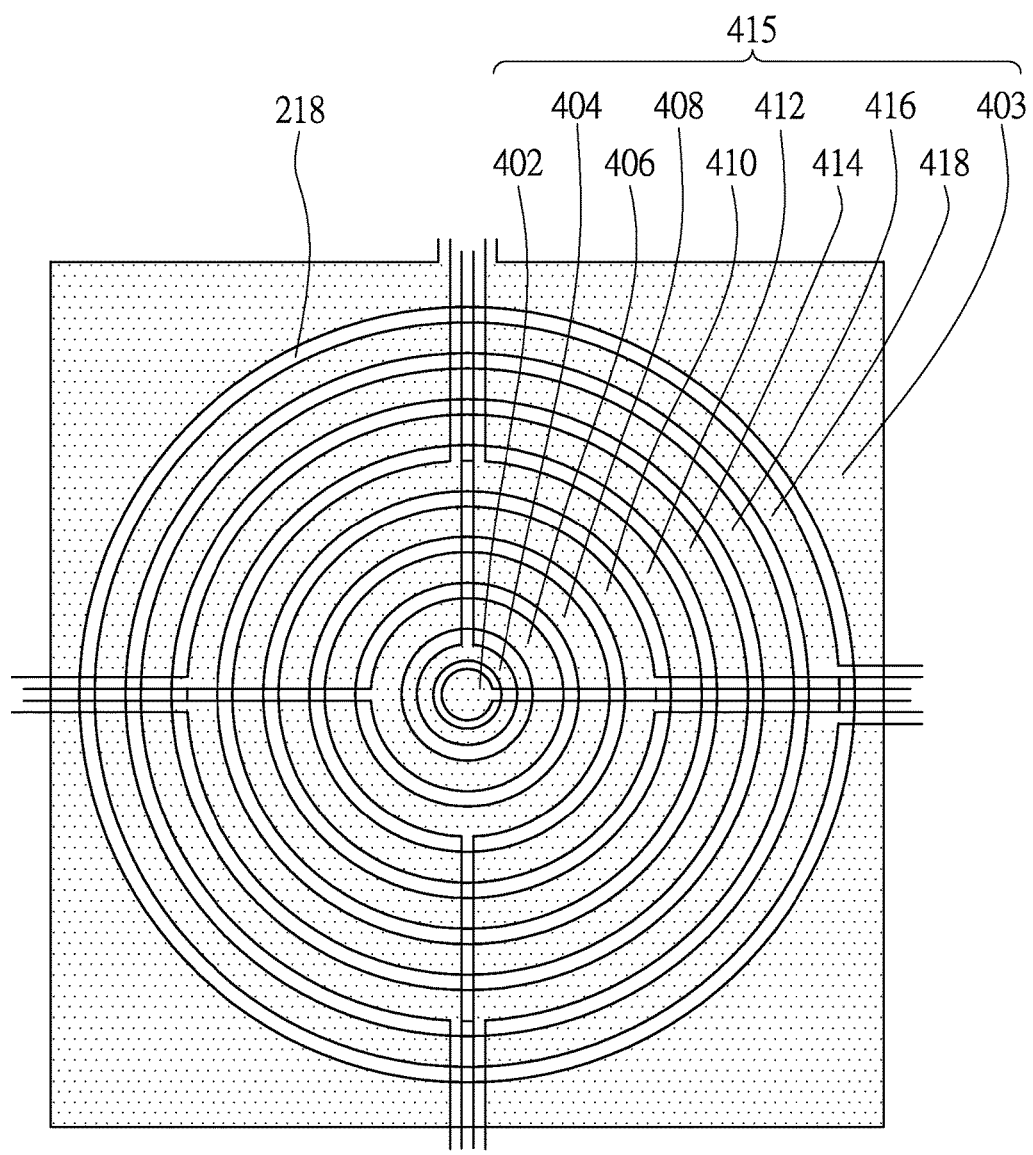
FIG. 4C is a planar view of a second transparent conductive layer as shown in FIG. 4A in accordance with the instant disclosure.

FIG. 4A is a cross-sectional view of a liquid crystal lens structure, FIG. 4B is a planar view of a first transparent conductive layer, and FIG. 4C is a planar view of a second transparent conductive layer in accordance with a third embodiment of the instant disclosure. Please refer to FIG. 4A. The liquid crystal lens structure in the instant embodiment includes a first substrate 202, a second substrate 204, a liquid crystal layer 211, a first transparent conductive layer 401, a second transparent conductive layer 415, a first alignment layer 202, and a second alignment layer 208. Details regarding the order of the layers are relatively the same as the first embodiment, thus are not further disclosed herein.

The instant embodiment differs from the first embodiment in that, the second transparent conductive layer 415 further includes a first annular electrode 404 circumscribing the circular electrode 402, a second annular electrode 406 circumscribing the first annular electrode 404, a third annular electrode 408 circumscribing the second annular electrode 406, a fourth annular electrode 410 circumscribing the third annular electrode 408, a fifth annular electrode 412 circumscribing the fourth electrode 410, a sixth annular electrode 414 circumscribing the fifth annular electrode 412, a seventh annular electrode 416 circumscribing the sixth electrode 414, an eighth annular electrode 418 circumscribing the seventh annular electrode 416, and all the annular electrodes are located in the circular opening. Accordingly, the first transparent conductive layer 401 is defined as a first electrode, portions of the second transparent conductive layer 415 circumscribing the circular opening 218 are defined as a second electrode. The first electrode, the second electrode, the circular electrode 402, the first annular electrode 404, the second annular electrode 406, the third annular electrode 408, the fourth annular electrode 410, the fifth annular electrode 412, the sixth annular electrode 414, the seventh annular electrode 416, and the eighth annular electrode 418 are mutually spaced apart. In the instant embodiment, the circular electrode and the first to eighth annular electrodes in the second transparent conductive layer are mutually spaced apart with a gap that ranges from 0.1 to 0.5 mm.

The first electrode, the second electrode, the circular electrode, and the first to the eighth annular electrodes can apply independent voltage, with respect to magnitude, duration, and timing, on each liquid crystal molecule in the circular opening of the liquid crystal layer in the most precise way, such that each liquid crystal molecule can rotate to the preset deflection angle in the targeted response time, and in turn provide the most preferred response time and effectiveness for a liquid crystal lens structure.

In an embodiment of the instant disclosure, an overdrive voltage can be applied to the circular electrode, at least one annular electrode, and the second electrode, then successively a steady-state voltage can be applied to the circular electrode, at least one annular electrode, and the second electrode. The magnitude of the overdrive voltages that are respectively applied to the circular electrode, at least one annular electrode, and the second electrode, in that order, are in a straightly descending or straightly ascending order. Also, the magnitude of the steady-state voltages that are respectively applied to the circular electrode, at least one annular electrode, and to the second electrode are in a straightly descending or straightly ascending order.

Figure 5:
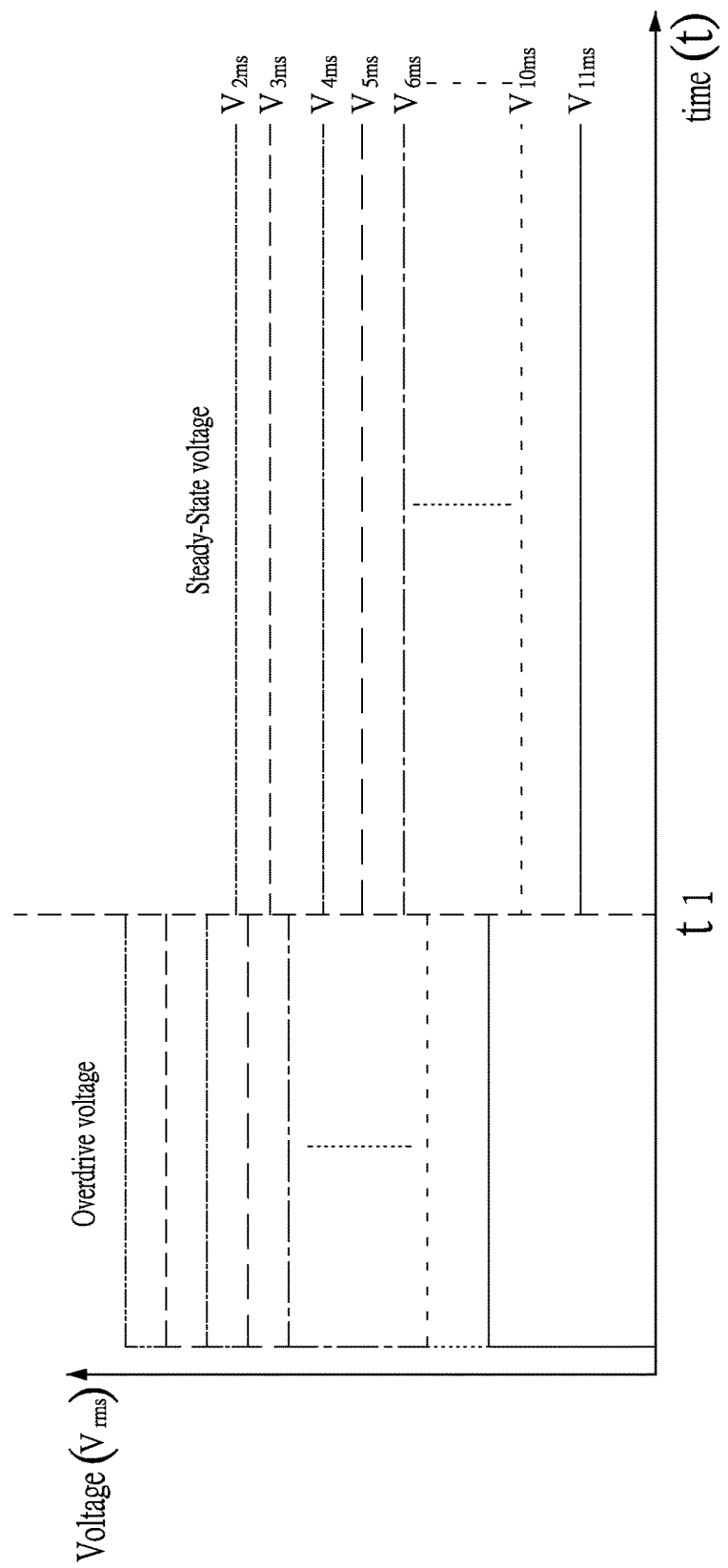
FIG. 5 is a schematic diagram illustrating the correlation between voltage and time of a first voltage driving method.

Please refer to FIG. 5. A voltage $V_{2ms}$ is applied to the circular electrode, a voltage $V_{3ms}$ is applied to the first annular electrode, a voltage $V_{4ms}$ is applied to the second annular electrode, a voltage $V_{5ms}$ is applied to the third annular electrode, a voltage $V_{6ms}$ is applied to the fourth annular electrode, a voltage $V_{7ms}$ is applied to the fifth annular electrode, a voltage $V_{8ms}$ is applied to the sixth annular electrode, a voltage $V_{9ms}$ is applied to the seventh annular electrode, a voltage $V_{10ms}$ is applied to the eighth annular electrode, and a voltage $V_{11ms}$ is applied to the second electrode (portions of the second transparent conductive electrode circumscribing the circular opening). Before time t1, $V_{2ms}$ to $V_{11ms}$ are all overdrive voltages, and then the voltages $V_{2ms}$ to $V_{11ms}$ sequentially decrease. After time t1, voltages $V_{2ms}$ to $V_{11ms}$ are all steady-state voltages, and then the voltages $V_{2ms}$ to $V_{11ms}$ sequentially decrease. Notably, the overdrive voltages are larger in value than the steady-state voltages.

Figure 6:
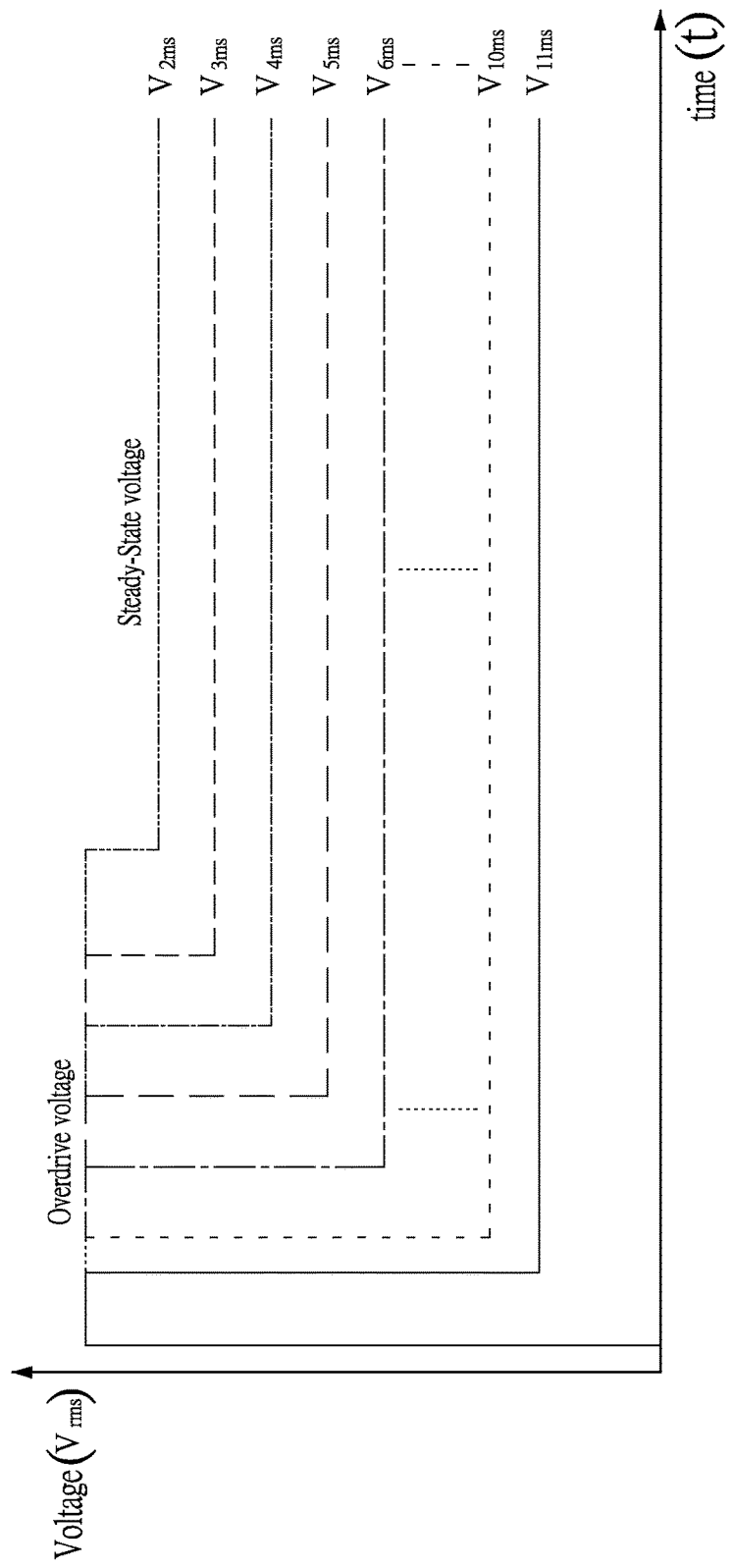
FIG. 6 is a schematic diagram illustrating the correlation between voltage and time of a second voltage driving method.

In an embodiment, overdrive voltage is sequentially applied to the circular electrode, at least one annular electrode, and the second electrode for a certain period of time, and the time at which the overdrive voltage is applied to the circular electrode is later than the time at which the overdrive voltage is applied to the second electrode. Please refer to FIG. 6 as an example. Overdrive voltages ($V_{2ms}$~$V_{11ms}$) are sequentially applied to the circular electrode, the second to the eighth annular electrodes, and the second electrode for a certain period of time. The time at which the circular electrode, the second to the eighth annular electrodes, and the second electrode apply the overdrive voltages is delayed from the order of $V_{2ms}$ to $V_{11ms}$. Successively, steady-state voltages are applied to the circular electrode, the second to the eighth annular electrodes, and the second electrode. Similarly, the steady-state voltages sequentially decrease from $V_{2ms}$ to $V_{11ms}$.

Figure 7:
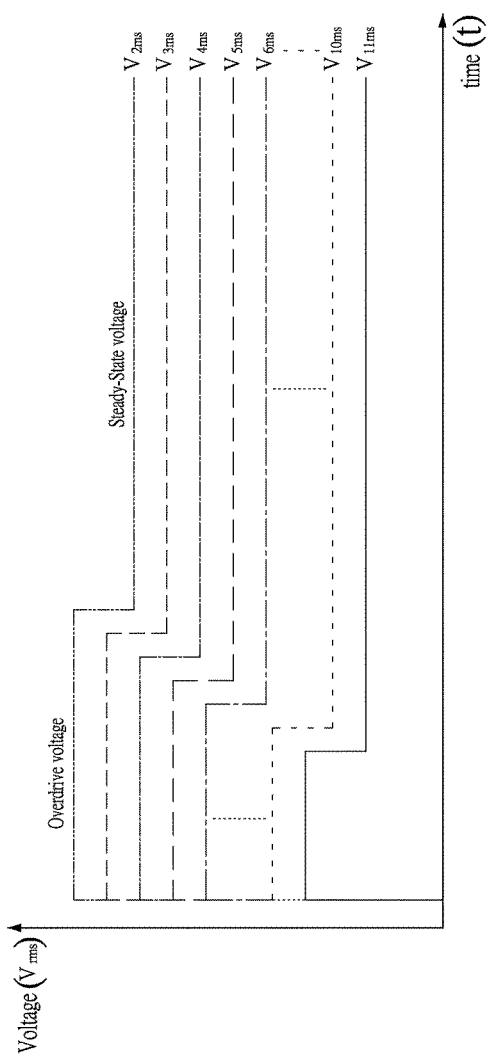
FIG. 7 is a schematic diagram illustrating the correlation between voltage and time of a third voltage driving method.

In an embodiment, the period that overdrive voltage is applied to the circular electrode is longer than the period that overdrive voltage is applied to the at least one annular electrode, whereas the period that overdrive voltage is applied to the at least one annular electrode is longer than the period that overdrive voltage is applied to the second electrode. Please refer to FIG. 7. For example, overdrive voltages ($V_{2ms}$~$V_{11ms}$) are sequentially applied to the circular electrode, the second to the eighth annular electrodes, and the second electrode for a certain period of time. The period that the circular electrode, the second to the eighth annular electrodes, and the second electrode apply the overdrive voltages is decreased from the order of $V_{2ms}$ to the order of $V_{11ms}$. Successively, steady-state voltages are applied to the circular electrode, the second to the eighth annular electrodes, and the second electrode.

Accordingly, the instant embodiment can target each liquid crystal molecule in the circular opening of the liquid crystal layer in the most precise way, such that each liquid crystal molecules can rotate to the preset deflection angle in the targeted response time, and in turn provide the most preferred response time and effectiveness from a liquid crystal lens structure.

The second embodiment discloses an annular electrode located in the circular opening. The third embodiment discloses eight annular electrodes located in the circular opening. However, the instant disclosure does not limit the quantity of annular electrodes necessary. Generally, in other embodiments, two annular electrodes can be arranged in the circular opening circumscribing the circular electrode of the liquid crystal lens structure. In other embodiments, the liquid crystal lens structure can be arranged with three, four, five, six, or seven annular electrodes in the circular opening while circumscribing the circular electrode. The quantity of annular electrode is set according the product specifications, which can also be nine, ten, or even ninety-eight, or ninety-nine, and is not limited to the examples provided herein.

[Possible Effectiveness of the Instant Embodiments]

In summary, the instant disclosure provides beneficial effects by disposing the transparent conductive layers on a side of the first substrate proximate to the liquid crystal layer, and a side of the second substrate distal from the liquid crystal layer, arranging a circular electrode and one or more annular electrodes in the circular opening of the transparent conductive layer that is disposed on the side of the second substrate distal from the liquid crystal layer, and each circular electrode and annular electrode can independently apply voltage in sequence, such that the liquid crystal molecules in the circular opening can receive the precise applied voltage, reach the preset deflection angle within the shortest amount of time, and in turn the liquid crystal lens structure can obtain the preferable or even the most preferred response time.

The figures and descriptions supra set forth illustrate the preferred embodiments of the instant disclosure; however, the characteristics of the instant disclosure are by no means restricted thereto. All changes, alterations, combinations or modifications conveniently considered by those skilled in the art are deemed to be encompassed within the scope of the instant disclosure delineated by the following claims.

What is claimed is:

1. A liquid crystal lens driving method, comprising:
   providing a liquid crystal lens structure, comprising:
      a first substrate having a first side and a second side opposite each other;
      a second substrate having a first side and a second side opposite each other;
      a liquid crystal layer interposed between the first substrate and the second substrate, wherein the first side of the first substrate and the first side of the second substrate are respectively adjacent to the liquid crystal layer;
      a first transparent conductive layer interposed between the first substrate and the liquid crystal layer;
      a second transparent conductive layer arranged on a the second side of the second substrate, wherein the second transparent conductive layer has a circular opening, a circular electrode, and at least one annular electrode circumscribing the circular electrode, the circular electrode is arranged in the circular opening, the first transparent conductive layer is defined as a first electrode, and portions of the second transparent conductive layer circumscribing the circular opening are defined as a second electrode;
   applying an overdrive voltage to the circular electrode, the at least one annular electrode, and the second electrode, wherein magnitude of the overdrive voltages that are respectively applied to the circular electrode, the at least one annular electrode, and the second electrode are in a straightly descending or ascending order, and wherein the overdrive voltage is applied to the circular electrode for a longer period than to the at least one annular electrode, and the overdrive voltage is applied to the at least one annular electrode for a longer period than to the second electrode;
   applying a steady-state voltage to the circular electrode, the at least one annular electrode, and the second electrode, wherein the magnitudes of the steady-state voltages that are respectively applied to the circular electrode, the at least one annular electrode, and the second electrode are in a straightly descending or ascending order.

2. The liquid crystal lens driving method as recited in claim 1, wherein the circular electrode, the at least one annular electrode, and the second electrode are sequentially applied with the overdrive voltage for a period of time, the overdrive voltage is applied to the circular electrode at a later time than the overdrive voltage is applied to the at least one annular electrode, and the overdrive voltage is applied to the at least one annular electrode at a later time than the overdrive voltage is applied to the second electrode.

3. A liquid crystal lens driving method, comprising:
   providing a liquid crystal lens structure, comprising:
      a first substrate;
      a second substrate;
      a liquid crystal layer interposed between the first substrate and the second substrate;
      a first transparent conductive layer interposed between the first substrate and the liquid crystal layer;
      a second transparent conductive layer arranged on the second side of the second substrate, wherein the second transparent conductive layer has a circular opening, a circular electrode, and at least one annular electrode circumscribing the circular electrode, the circular electrode is arranged in the circular opening, the first transparent conductive layer is defined as a first electrode, and portions of the second transparent conductive layer circumscribing the circular opening are defined as a second electrode;
   applying an overdrive voltage to the circular electrode, the at least one annular electrode, and the second electrode, and wherein magnitude of the overdrive voltages that are respectively applied to the circular electrode, the at least one annular electrode, and the second electrode are in a straightly descending or ascending order;
   applying a steady-state voltage to the circular electrode, the at least one annular electrode, and the second electrode, wherein the magnitudes of the steady-state voltages that are respectively applied to the circular electrode, the at least one annular electrode, and the second electrode are in a straightly descending or ascending order;
   wherein the circular electrode, the at least one annular electrode, and the second electrode are sequentially applied with the overdrive voltage for a period of time, the overdrive voltage is applied to the circular electrode at a later time than the overdrive voltage is applied to the at least one annular electrode, and the overdrive voltage is applied to the at least one annular electrode at a later time than the overdrive voltage is applied to the second electrode.

4. A liquid crystal lens driving method, comprising:
   providing a liquid crystal lens structure, comprising:
      a first substrate;
      a second substrate;
      a liquid crystal layer interposed between the first substrate and the second substrate;
      a first transparent conductive layer interposed between the first substrate and the liquid crystal layer;
      a second transparent conductive layer arranged on the second side of the second substrate, wherein the second transparent conductive layer has a circular opening, a circular electrode, and at least one annular electrode circumscribing the circular electrode, the circular electrode is arranged in the circular opening, the first transparent conductive layer is defined as a first electrode, and portions of the second transparent conductive layer circumscribing the circular opening are defined as a second electrode;

applying an overdrive voltage to the circular electrode, the at least one annular electrode, and the second electrode, and wherein magnitude of the overdrive voltages that are respectively applied to the circular electrode, the at least one annular electrode, and the second electrode are in a straightly descending or ascending order;

applying a steady-state voltage to the circular electrode, the at least one annular electrode, and the second electrode, wherein the magnitudes of the steady-state voltages that are respectively applied to the circular electrode, the at least one annular electrode, and the second electrode are in a straightly descending or ascending order;

wherein the overdrive voltage is applied to the circular electrode for a longer period than to the at least one annular electrode, and the overdrive voltage is applied to the at least one annular electrode for a longer period than to the second electrode.

* * * * *